Nov. 17, 1942.    P. M. WAITE    2,302,590
RIVET
Filed Dec. 6, 1940
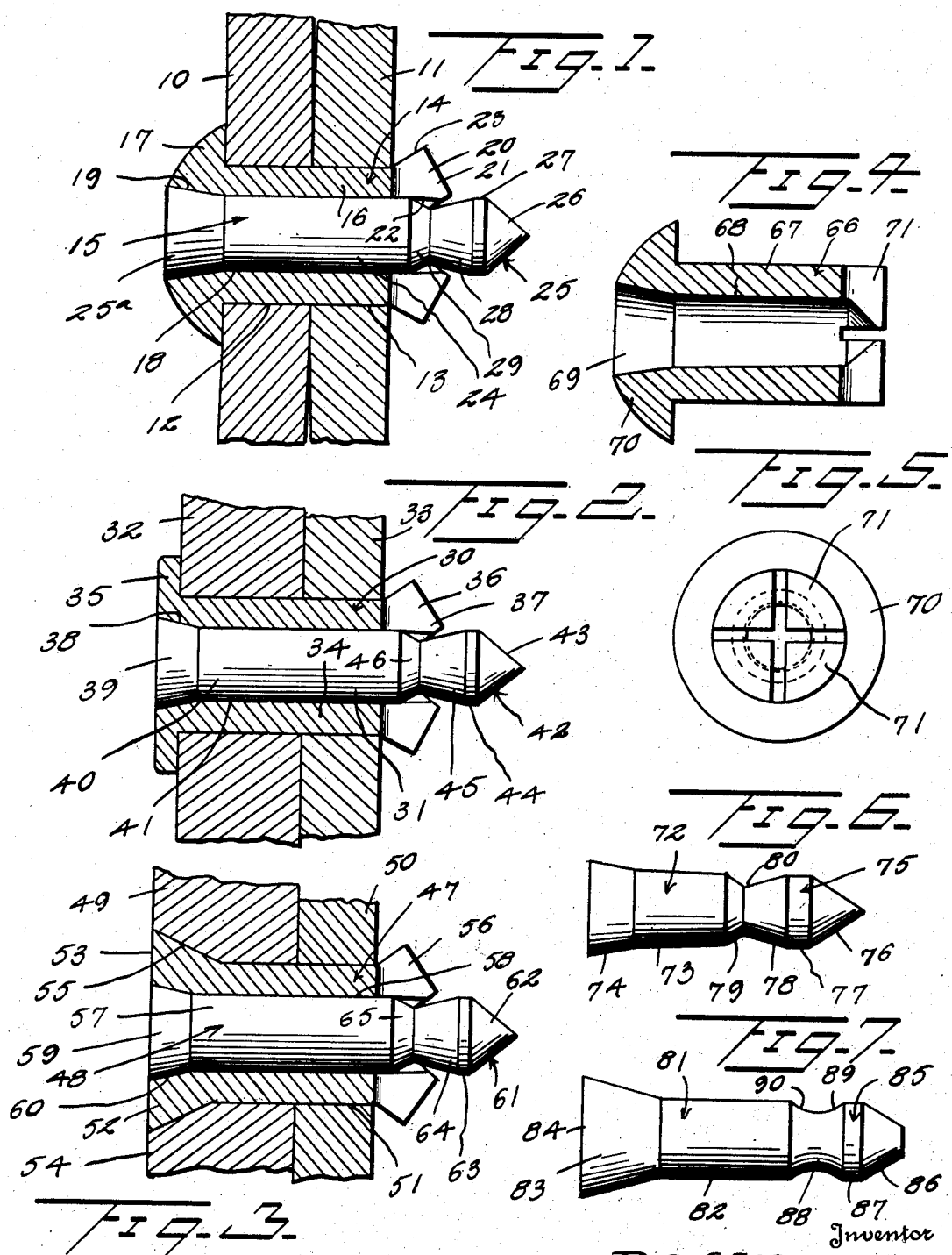
Inventor
P. M. Waite
By Kimmel & Crowell
Attorneys Patented Nov. 17, 1942

2,302,590

UNITED STATES PATENT OFFICE 2,302,590

RIVET

Philip Maurice Waite, Corry, Pa., assignor to Aero Supply Mfg. Co. Inc., Corry, Pa.

Application December 6, 1940, Serial No. 368,920

1 Claim. (Cl. 85—40)

This invention relates to rivets and more particularly to a two part rivet designed for use in airplane assembling.

An object of this invention is to provide a rivet which is formed of a headed hollow body and means initially movable in said body for clinching the body to the work, the body and the initially movable element being so formed as to lock the element against movement relative to the other and to the work.

At the present time in securing two or more members together by cold rivets, several different types of rivets are available, one type including a threaded clinching pin and another including a straight clinching pin. In each of these types of rivets, the clinching pin is capable of working loose under vibration, and as a result the clinching portion of the rivet is capable of working loose, and in addition the clinching pin may when loosened drop out of the hollow rivet body. It is, therefore, an object of this invention to provide a two part rivet which may be set by the use of a light hammer, and which is so constructed that the clinching pin is incapable of working loose sufficiently to drop out of the body.

Another object of this invention is to provide a rivet structure which is so constructed that two or more metal sheets may be tightly drawn together during the setting of the rivet.

A further object of this invention is to provide a rivet of this kind which may be set from the outside of a hollow body, so that the hollow body may be completely enclosed by a sheet metal covering without providing a manhole to permit access to the interior of the body during the riveting operation.

A still further object of this invention is to provide a rivet of this kind which will not only tightly draw and hold together two or more metal parts, but which is so constructed that during the applying of the rivet, the outer hollow part thereof will be enlarged sufficiently to tightly bind the body in the hole so that the hollow rivet part is not only held against endwise movement by the upset opposite ends thereof but is held against endwise and rotary movement by the binding contact of the body in the rivet hole.

A further object of this invention is to provide a rivet of this kind in which the clinching pin is not only held against withdrawal by the clinching fingers, but the clinching pin when in rivet setting position will hold the clinching fingers against contracting so that it will not be possible for the clinching fingers to work loose.

To the foregoing objects and to others which may hereinafter appear, the invention consists of the novel construction, combination and arrangement of parts as will be more specifically referred to and illustrated in the accompanying drawing wherein is shown embodiments of the invention, but it is to be understood that changes, variations and modifications may be resorted to which fall within the scope of the invention as claimed.

In the drawing:

Figure 1 is a longitudinal section partly in detail of a rivet constructed according to an embodiment of this invention.

Figure 2 is a longitudinal section partly in detail of a slightly modified form of rivet.

Figure 3 is a longitudinal section partly in detail of another modification of this invention.

Figure 4 is a longitudinal section through the outer shell of a further modification of this rivet structure.

Figure 5 is an inner end elevation of the rivet shown in Figure 4.

Figure 6 is a detail side elevation of a modified form of a clinching pin.

Figure 7 is a detail side elevation of a further modified form of a clinching pin.

Referring to the drawing, the numerals 10 and 11 designate a pair of work pieces such as metal plates or the like, which are adapted to be riveted together by the improved rivet structure to be hereinafter described. The plate 10 is provided with an opening 12 and the plate 11 is provided with an opening 13 which is of substantially the same diameter as the opening 12 and is adapted to be disposed in registry with the opening 12. In order to provide a means whereby the two work pieces may be securely held together by cold rivets and by rivets which are inserted through the outer side of the work piece 10 and secured tightly in position only from the outer side of the work piece 10, I have provided a rivet structure which includes a pair of telescoping rivet members generally designated as 14 and 15. The rivet member 14 comprises a substantially cylindrical sleeve 16, which at its outer end, is provided with a part round head 17.

The sleeve 16 is formed with a cylindrical bore 18 and the head 17 is formed with an inwardly reducing frusto-conical opening 19, which merges at its inner end with the bore 18. The inner end of the sleeve 16 is provided with a plurality of circumferentially spaced apart clinching fingers 20, which in their initially unclined position, have an inwardly extending clinching pin engaging portion 21 which extends partly across the inner end of the bore 18 of the sleeve 16. Each finger 20 is provided with a parti-conical inner face 22 and with a parti-cylindrical outer surface 23, which in its initial position is adapted to be disposed in alignment with the outer cylindrical surface of the sleeve 16, but which in its clinching position is adapted to be disposed at an obtuse angle to the length of the sleeve 16 as shown in Figure 1. The inner rivet member 15 comprises a cylindrical pin body 24 which at its outer end is formed with a frusto-conical head 25ª snugly engageable in the frusto-conical opening 19 of the head 17.

The pin body 24 is preferably of such a size that when the inner member 15 is inserted within the sleeve 16, it must be driven into the sleeve 16 by a tool such as a light hammer or the like. In this manner, the cylindrical body 24 will snugly and tightly engage within the sleeve 16.

The inner end of the body 24 has secured thereto and formed integral therewith and disposed in inwardly spaced relation therefrom, a finger clinching head generally designated as 25. The head 25 comprises a conical inner head part 26, a cylindrical head part 27 which extends outwardly from the base of the head part 26 and is of a diameter substantially to the diameter of the body 24. The head member 25 also includes an outwardly reducing or frusto-conical head part 28 which extends outwardly from cylindrical head part 27 and the frusto-conical head part 28 is disposed in opposed relation to a second frusto-conical connecting part 29 which extends inwardly from the cylindrical body 24.

The two opposed frusto-conical parts 28 and 29 form a groove or annular channel between the inner end of the body 24 and the outer end of the cylindrical head part 27. The groove formed by the opposed frusto-conical parts 28 and 29 provides a means whereby the inner ends of the clinching fingers 20 may spring inwardly a slight distance so that they may be in substantial contact with the outer head part 28. In this substantially contacting position of the fingers 20 relative to the head part 28, the inner rivet member 15 is locked against outward movement so that the inner rivet member 15 will not be able to become loosened and drop out of the sleeve 16 under vibrations or variations in temperature conditions. Furthermore, the reduced part 28 of the head 25 also provides a means whereby the clinching fingers 20 will not be able to bend inwardly to an unclinching or released position. When the clinching fingers 20 are in their original unclinched position, they will be disposed in the position shown in Figure 4.

In Figure 2, there is disclosed a slightly modified form of this invention wherein a rivet structure is disclosed embodying a pair of telescoping members 30 and 31 which are adapted to hold a pair of work pieces 32 and 33 together. The member 30 is an outer member and comprises a tubular sleeve member 34 which at its outer end is provided with an annular flange or flat head 35. The opposite end of the sleeve 34 has formed therewith a plurality of circumferentially arranged and spaced apart clinching fingers 36. The clinching fingers 36 are similar in every detail to the clinching fingers 20 and include a pin engaging inner part 37.

The sleeve 34 adjacent the outer end thereof is provided with a frusto-conical opening 38 communicating with the bore of the sleeve 34 and the frusto-conical head 39 of the inner rivet member 31 is adapted to snugly engage in the opening or socket 38. The outer surface of the head 39 is adapted to be substantially flush with the outer surface of the flange 35 so that when the inner rivet member 31 is an applied position, a smooth flat surface will be provided between the flange 35 and the head 39. The inner rivet member 31 also includes a cylindrical body 40 which is snugly engageable in the cylindrical bore 41 of the sleeve 34 and the body 40 at its inner end has secured thereto in inwardly spaced relation therefrom, a clinching head generally designated as 42.

The head 42 is similar in every detail to the head 25 and includes a conical inner end 43, a cylindrical base part 44 and an outer frusto-conical head part 45. The frusto-conical head part 45 is connected at its outer end to a reversely tapered frusto-conical connecting member 46 which extends inwardly from the body 40.

In Figure 3, there is disclosed a further modification of this invention, wherein a pair of telescoping rivet members 47 and 48 are adapted to tightly hold together a pair of work pieces 49 and 50. The outer member 47 includes a cylindrical sleeve 51 which at its outer end is provided wtih a frusto-conical head 52. The outer surface 53 of the head 52 is adapted to be disposed flush with the adjacent outer surface 54 of the work piece 49, the work piece 49 being formed with a frusto-conical socket 55 in which the head 52 is adapted to snugly engage. The inner end of the outer rivet member 57 is provided with a plurality of circumferentially spaced apart clinching fingers 56 which are similar in every detail to the fingers 20 and are adapted in their retracted or initial unbent position to be disposed as shown in Figure 4.

The inner rivet member 48 which is disposed in telescoping relation with respect to the outer member 47 comprises a substantially cylindrical body 57 which snugly engages in the cylindrical bore 58 of the sleeve 47 and the body 57 at its outer end is provided with a frusto-conical or tapered head 59 which is engageable in a frusto-conical socket 60 formed in the head 52. The outer surface of the head 59 is adapted to be disposed flush with the outer surface 53 of the head 52.

The inner end of the inner rivet or clinching member 48 has formed integral therewith a clinching head generally designated as 61. The head 61 is disposed in inwardly spaced relation to the inner end of the body or core 48 and comprises a conical inner head member 62, a cylindrical base member 63 and an outer finger locking member 64 which is of frusto-conical configuration. The outer finger locking member 64 is connected at the apex thereof with the apex of a frusto-conical member 65 which constitutes a connecting member and which connects the inner end of the cylindrical body 57 with the outer head member 64. The frusto-conical member 65 is disposed in reverse position to the frusto-conical member 64 so as to thereby form an annular groove between the inner end of the cylindrical member 57 and the outer end of the cylindrical base 63.

In Figure 4, there is disclosed a slightly modified form of an outer rivet member generally designated as 66 which is constructed somewhat similar to the outer rivet member 14 in Figure 1. The outer rivet member 66 comprises a cylindrical hollow body 67 which is provided with an inwardly tapered bore 68. The largest diameter of the bore 68 is outermost and communicates with a frusto-conical socket 69 which is formed in a rounded head 70. The inner end of the sleeve 67 has formed integral therewith, a plurality of circumferentially spaced apart clinching fingers 71 which are adapted to be bent outwardly into a clinching position similar to the position of the fingers 20 upon insertion within the bore 68 of a clinching pin. The clinching pin which is adapted to be used with the rivet member 66 may be a pin similar to the pin 15 which is provided with a cylindrical periphery or if desired the pin used with the rivet member 66 may be of the type shown in Figure 6 wherein the body of the pin is also tapered.

In Figure 6, there is disclosed a modified form of inner rivet member generally designated as 72. The rivet member or pin 72 comprises a tapered body 73 which is provided at its outer end with a frusto-conical or tapered flat head 74. A finger clinching head generally designated as 75 is formed integral with the body 73 and is disposed in inwardly spaced relation with respect thereto. The clinching head 75 comprises an inner conical point or head member 76, a cylindrical base or intermediate member 77 and an outer frusto-conical head part 78. The head part 78 is connected to the body 73 by means of a frusto-conical connecting member 79 which is disposed in a reversed position with respect to the head part 78 so as to thereby form between the two members 78 and 79, an annular groove 80. As hereinbefore stated, the pin 72 may be used either with the outer rivet members 14, 30, 47 or 66.

In Figure 7, there is disclosed another modified form of clinching pin or inner rivet member 81. The rivet member 81 comprises a substantially cylindrical body 82 which has formed integral therewith, a frusto-conical head 83 having a flat outer surface 84. The body 82 has secured to the inner end thereof and in spaced relation thereto, a finger clinching head member generally designated as 85. The head member 85 comprises a frusto-conical head part 86 and a cylindrical base part 87.

The base part 87 is connected to the body part 82 by means of a peripheral grooved connecting part 88. The groove in the connecting part 88 is arcuate in transverse section and the inner arcuate portion 89 of the groove 88 comprises a finger locking portion whereas the outer arcuate part 90 of the groove 88 comprises a connecting part for connecting the locking portion 89 with the body 82.

In the use and operation of this rivet structure, the two work pieces 10 and 11 are provided with the axially aligned holes 12 and 13 and the outer rivet member 14 is then inserted in the aligned openings 12 and 13 until the head 17 contacts with the outer face of the work piece 10. The sleeve 16 is of such a length that the clinching fingers 20 will be disposed in inwardly projecting relation with respect to the inner surface of the inner work piece 11.

It will be understood that during the application of the rivet structure hereinbefore described, it is not necessary that the two work pieces 10 and 11 be tightly held together during the application of the rivet structure. After the sleeve 16 has been inserted in the aligned openings 12 and 13, the inner rivet member 15 is inserted in the bore 18 of the sleeve 16. The head 25ᵃ may then be struck by a hammer or the like so as to force the body 24 inwardly until the conical head member 26 contacts with the retracted clinching fingers 20. The conical head member 26 upon further inward movement of the inner rivet member 15 will bend the clinching fingers 20 outwardly to the position shown in Figure 1. After the cylindrical base part 27 of the clinching head 25 passes the head engaging portions 21 of the fingers 20, the resiliency of the metal forming the fingers 20 will cause the inner portions 21 of the fingers to be drawn inwardly a sufficient distance so that the circle described by the fingers 20 will be of a diameter less than the diameter of the cylindrical head part 27. The cylindrical head part 27 of the head 25 will thereby constitute a locking head portion which will lock the pin 15 against outward movement in the event the pin 15 should become loosened within the bore 18 due to vibration, temperature conditions or the like. In addition, the reduction of the diameter of the inner portions of the fingers 20 will also prevent the fingers 20 from being bent inwardly a sufficient distance to permit the sleeve 16 to be withdrawn or drop out of the holes 12 and 13.

With a construction similar to that shown in Figure 4, where a straight inner rivet member similar to the inner rivet member 15 is used with the tapered bore 68, when the straight inner rivet member is forced inwardly within the tapered bore 68, the inner rivet member will have a tendency to enlarge or swedge the outer rivet member 66 so that this outer rivet member will be more tightly held in the rivet holes than will the outer rivet member 14 shown in Figure 1. In addition to the foregoing, the tapering of the bore of the sleeve 67 will provide a more tight fit between the sleeve 67 and the inner rivet member or pin.

With a rivet construction as hereinbefore described, it is possible to upset the inner end of a rivet from the outer end thereof thus making it possible to enclose a body with a covering such as a sheet metal covering without the necessity of providing an opening in the covering through which an anvil may be extended for contact with the inner end of the rivet.

What I claim is:

A rivet capable of insertion through one side of a work-piece and capable of being upset and locked in the work-piece from said one side, said rivet comprising a tubular body for insertion through an opening in the work-piece, a head fixed to the outer end of said body, a split head fixed to the inner end of said body and including inwardly projecting integral resilient fingers, and a head expanding member insertible in said body from the outer end thereof, said member including a cylindrical pin, a conical expanding head at the inner end of said pin for spreading said split head to clamping position, a reversely disposed frusto-conical locking member extending outwardly from said expanding head, and means carried by the outer end of said pin for limiting the inward movement of said pin within said body, said expanding head being disposed in inwardly spaced relation to said fingers when said pin is inserted in said body to the limit permitted by said limiting means, and said locking member confronting said fingers and substantially contacting with the latter to thereby hold said pin against outward movement.

PHILIP M. WAITE.